(12) United States Patent
Li et al.

(10) Patent No.: US 11,817,601 B2
(45) Date of Patent: Nov. 14, 2023

(54) BATTERY, POWER CONSUMPTION DEVICE, METHOD AND DEVICE FOR PRODUCING BATTERY

(71) Applicant: CONTEMPORARY AMPEREX TECHNOLOGY CO., LIMITED, Ningde (CN)

(72) Inventors: Xianda Li, Ningde (CN); Xiaobo Chen, Ningde (CN); Yao Li, Ningde (CN); Lu Hu, Ningde (CN); Jinru Yue, Ningde (CN); Piaopiao Yang, Ningde (CN); Mingguang Gu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/953,734

(22) Filed: Sep. 27, 2022

(65) Prior Publication Data
US 2023/0025270 A1    Jan. 26, 2023

Related U.S. Application Data

(63) Continuation of application No. 17/550,011, filed on Dec. 14, 2021, now Pat. No. 11,489,231, which is a
(Continued)

(51) Int. Cl.
*H01M 50/375* (2021.01)
*H01M 50/342* (2021.01)
(Continued)

(52) U.S. Cl.
CPC ....... *H01M 50/375* (2021.01); *H01M 10/613* (2015.04); *H01M 10/625* (2015.04);
(Continued)

(58) Field of Classification Search
CPC ............. H01M 50/375; H01M 10/613; H01M 10/625; H01M 10/6556; H01M 50/3425;
(Continued)

(56) References Cited

U.S. PATENT DOCUMENTS

| | | | |
|---|---|---|---|
| 9,032,741 B2 | 5/2015 | Tanaka | |
| 2009/0075158 A1* | 3/2009 | Rudorff | H01M 10/52 429/53 |

(Continued)

FOREIGN PATENT DOCUMENTS

| | | |
|---|---|---|
| CN | 108598326 A | 9/2018 |
| CN | 209401662 U | 9/2019 |

(Continued)

OTHER PUBLICATIONS

International Search Report and Written Opinion dated Jan. 5, 2022 received in International Application No. PCT/CN2021/084441.
(Continued)

*Primary Examiner* — Muhammad S Siddiquee
(74) *Attorney, Agent, or Firm* — Scully, Scott, Murphy & Presser, P.C.

(57) ABSTRACT

Embodiments of the present application provide a battery, a power consumption device, a method and a device for producing the battery. The battery includes: a battery cell, including a pressure relief mechanism, wherein the pressure relief mechanism is disposed on a first wall of the battery cell; a thermal management component, wherein a first surface of the thermal management component is attached to the first wall, and the thermal management component is provided with a pressure relief hole opposite to the pressure relief mechanism; and a baffle configured to cover a part of the pressure relief hole, so that when the pressure relief mechanism is actuated, a discharge direction of the emissions entering the pressure relief hole is changed. The
(Continued)

battery, the power consumption device, the method and the device for producing the battery provided in the embodiments of the present application can enhance safety of batteries.

17 Claims, 7 Drawing Sheets

Related U.S. Application Data continuation of application No. PCT/CN2021/084441, filed on Mar. 31, 2021.

(51) Int. Cl.
  *H01M 10/6556* (2014.01)
  *H01M 10/625* (2014.01)
  *H01M 10/613* (2014.01)

(52) U.S. Cl.
  CPC ... *H01M 10/6556* (2015.04); *H01M 50/3425* (2021.01); *H01M 2220/20* (2013.01)

(58) Field of Classification Search
  CPC .......... H01M 2220/20; H01M 10/647; H01M 10/653; H01M 50/209; H01M 50/249; H01M 50/383; H01M 50/55; H01M 50/682; H01M 10/623; H01M 50/247; H01M 2200/10; H01M 2200/20; Y02E 60/10
  See application file for complete search history.

(56) References Cited

U.S. PATENT DOCUMENTS

| | | |
|---|---|---|
| 2017/0170439 A1 | 6/2017 | Jarvis et al. |
| 2018/0255744 A1* | 9/2018 | Wagner ............... A01K 1/0064 |
| 2018/0316071 A1 | 11/2018 | Newman et al. |
| 2019/0157636 A1 | 5/2019 | Miler et al. |
| 2019/0229384 A1 | 7/2019 | Tasiopoulos et al. |
| 2021/0104801 A1* | 4/2021 | Chu ................. H01M 10/6561 |

FOREIGN PATENT DOCUMENTS

| | | |
|---|---|---|
| CN | 112018302 A | 12/2020 |
| CN | 112018320 A | 12/2020 |
| CN | 112072046 A | 12/2020 |
| CN | 112490578 A | 3/2021 |
| JP | 2019207769 A | 12/2019 |

OTHER PUBLICATIONS

Extended European Search Report dated Sep. 26, 2022 received in European Patent Application No. EP 21755670.3.
Office Action dated Mar. 15, 2022 received in U.S. Appl. No. 17/550,011.
Notice of Allowance dated Jun. 30, 2022 received in U.S. Appl. No. 17/550,011.

* cited by examiner

BATTERY, POWER CONSUMPTION DEVICE, METHOD AND DEVICE FOR PRODUCING BATTERY

CROSS-REFERENCE TO RELATED APPLICATIONS

This application is a continuation of U.S. patent application Ser. No. 17/550,011 filed on Dec. 14, 2021, which is a continuation of International Application No. PCT/CN2021/084441, filed on Mar. 31, 2021. The disclosure of which is hereby incorporated by reference in its entirety.

TECHNICAL FIELD

The present application relates to a field of battery technologies, and in particular, to a battery, a power consumption device, a method and a device for preparing the battery.

BACKGROUND

Energy saving and emission reduction are the key to a sustainable development of automotive industry. In this case, electric vehicles have become an important part of the sustainable development of the automotive industry due to their advantages of energy saving and environmental protection. For the electric vehicles, battery technology is an important factor for their development.

In the development of the battery technology, in addition to improving performance of batteries, safety is also an issue that cannot be ignored. If the safety of the batteries cannot be ensured, the batteries cannot be used. Therefore, how to enhance the safety of the batteries is an urgent technical problem to be solved in the battery technology.

SUMMARY

The present application provides a battery, a power consumption device, a method and a device for producing the battery, which could enhance safety of batteries.

In a first aspect, a battery is provided, including: a battery cell, including a pressure relief mechanism, where in the pressure relief mechanism is disposed on a first wall of the battery cell, and the pressure relief mechanism is configured to be actuated when an internal pressure or temperature of the battery cell reaches a threshold, to relieve the internal pressure; a thermal management component configured to accommodate a fluid to adjust a temperature of the battery cell, where in a first surface of the thermal management component is attached to the first wall, and the thermal management component is provided with a pressure relief hole opposite to the pressure relief mechanism, so that when the pressure relief mechanism is actuated, emissions discharged from the battery cell can pass through the thermal management component by the pressure relief hole to be discharged; and a baffle configured to cover a part of the pressure relief hole, so that when the pressure relief mechanism is actuated, a discharge direction of the emissions entering the pressure relief hole is changed.

Therefore, for the battery of embodiments of the present application, the baffle is disposed on the thermal management component to cover a part of the pressure relief hole, when the pressure relief mechanism is actuated and the emissions discharged from the battery cell enter the pressure relief hole, the emissions may directly contact the baffle and reflect on a surface of the baffle before passing through the pressure relief hole or after passing through the pressure relief hole, thereby changing an original discharge direction of the emissions, so that more high temperature emissions could contact the thermal management components to achieve a better cooling effect, this avoids, as far as possible, a case where the high temperature emissions flowed too smoothly through the pressure relief hole and could not fully contact the thermal management component.

In some embodiments, a maximum distance between the baffle and the first wall is greater than a minimum distance from the first surface to the first wall.

The fluid is accommodated in the thermal management component, and the baffle is further away from the wall provided with the pressure relief mechanism than the thermal management component, so that the emissions passing through the pressure relief hole are reflected after contacting the baffle, in order to ensure that more emissions contact the thermal management component to achieve the better cooling effect.

In some embodiments, the baffle is inclined with respect to an axis of the pressure relief hole, the baffle gradually approaches the axis of the pressure relief holes along a direction away from the first wall, so that when the pressure relief mechanism is actuated, the emissions can impact toward a hole wall of the pressure relief hole.

In some embodiments, a value of an angle between the baffle and the axis of the pressure relief hole ranges from 20° to 40°.

If the angle is set too large, an area of the baffle covering the pressure relief hole will be too large and the pressure relief hole will be blocked, affecting the passage of the emissions discharged from the battery cell when the pressure relief mechanism is actuated, which may result in poor exhaust and further cause the battery cell to explode. On the contrary, if the angle is set too small, a reflection effect of the emissions on the surface of the baffle will be affected. Therefore, the value of the angle is usually set to be from 20° to 40° to achieve an optimal effect.

In some embodiments, the pressure relief hole is surrounded by two baffles arranged opposite to each other.

In some embodiments, a ratio of an area of the baffle covering the pressure relief hole to an area of the pressure relief mechanism is not less than 0.5 and not more than 0.8, so that it could not hinder the discharge of the emissions, but also enable the emissions to contact the thermal management component in a large area after being reflected on the surface of the baffle.

In some embodiments, a surface roughness of the baffle is less than or equal to 0.1 μm Considering that if the surface of the baffle is too rough, high temperature particles in the emissions may accumulate on the surface of the baffle and cannot rebound, thereby affecting an effect of the baffle, so that the surface of the baffle should usually be set as a relatively smooth surface.

In some embodiments, the baffle is disposed on a second surface of the thermal management component, the second surface is opposite to the first surface, or the second surface is the hole wall of the pressure relief hole.

In some embodiments, the battery further includes: an electrical chamber configured to accommodate a plurality of battery cells; a collection chamber configured to collect the emissions discharged from the battery cell and emissions from the thermal management component when the pressure relief mechanism is actuated, where in the thermal management component is configured to isolate the electrical chamber from the collection chamber.

In some embodiments, the battery further includes: a protective member, the protective member is configured to protect the thermal management component, and the protective member and the thermal management component form the collection chamber.

In some embodiments, the protective member includes a bottom wall and a plurality of side walls to form a hollow structure with an opening at one end, and the thermal management component covers the opening to form the collection chamber.

In some embodiments, an end of the baffle away from the first wall abuts against the bottom wall of the protective member along an axis of the pressure relief hole.

At least one battery cell is disposed on a surface of the thermal management component. By abutting one end of the baffle against the bottom wall of the protective member, the thermal management component could be supported to ensure a distance between the thermal management component and the protective member, that is, ensure a space of the collection chamber, thereby avoiding an explosion in the collection chamber.

In addition, in the case where two baffles are arranged opposite to each other in each pressure relief hole, if a lower end of the baffle abuts against the bottom wall of the protective member, the high temperature emissions may be divided into two opposite channels for discharge under an action of the baffle after passing through the pressure relief hole. In particular, high temperature gas in the high temperature emissions may be centrally divided into two channels by the baffle after entering the collection chamber, which further increases a possibility of the high temperature gas melting a lower surface of the thermal management component, so that the thermal management component could be damaged in a large area and an internal fluid thereof flows out in large quantities, improving a cooling effect.

In some embodiments, the thermal management component is configured to be capable of being damaged, when the pressure relief mechanism is actuated, by the emissions whose discharge direction has been changed, so that the fluid is discharged from the interior of the thermal management component.

In some embodiments, the thermal management component is provided with a temperature-sensitive material, the temperature-sensitive material is configured to be melted by the emissions when the pressure relief mechanism is actuated, so that the fluid is discharged from the interior of the thermal management component.

In some embodiments, the temperature-sensitive material is disposed on an area of the thermal management component facing the emissions from the battery cell.

For example, the temperature-sensitive material may be disposed on the hole wall of the pressure relief hole, or may be disposed around the pressure relief hole on the first surface of the thermal management component, so that when the emissions from the battery cell pass through the pressure relief hole, the temperature-sensitive material can be melted to smoothly discharge the fluid in the thermal management component, thereby better cooling.

In a second aspect, a power consumption device is provided, including: the battery in the first aspect configured to provide electrical energy.

In some embodiments, the power consumption device is a vehicle, a ship or a spacecraft.

In a third aspect, a method for producing a battery is provided, including: providing a battery cell, where in the battery cell includes a pressure relief mechanism, the pressure relief mechanism is disposed on a first wall of the battery cell, and the pressure relief mechanism is configured to be actuated when an internal pressure or temperature of the battery cell reaches a threshold, to relieve the internal pressure; providing a thermal management component, where in the thermal management part is configure to accommodate a fluid to adjust a temperature of the battery cell, a first surface of the thermal management component is attached to the first wall, and the thermal management component is provided with a pressure relief hole opposite to the pressure relief mechanism, so that when the pressure relief mechanism is actuated, emissions discharged from the battery cell can pass through the pressure relief hole by the pressure relief hole to be discharged; and providing a baffle, the baffle being configured to cover a part of the pressure relief hole, so that when the pressure relief mechanism is actuated, a discharge direction of the emissions entering the pressure relief hole is changed.

In a fourth aspect, a device for producing a battery is provided, including a module for carrying out the method of the third aspect described above.

Figure 1:
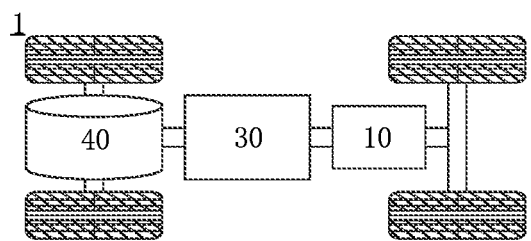
FIG. 1 is a schematic structural diagram of a vehicle according to an embodiment of the present application.

In the accompanying drawings, the drawings are not drawn to actual scale.

DESCRIPTION OF EMBODIMENTS

Implementation manners of the present application will be further described below in detail with reference to drawings and embodiments. The detailed description and drawings of the following embodiments are configured to exemplarily illustrate principles of the present application, but cannot be used to limit the scope of the present application, that is, the present application is not limited to the described embodiments.

In the description of the present application, it should be noted that, unless otherwise provided, "a plurality of" means more than two (including two); orientations or positional relationship indicated by the terms such as "above", "below", "left", "right", "outside", "inside" and the like are merely for convenience of describing the present application and for simplifying the description, rather than for indicating or implying that an indicated apparatus or element must have a specific orientation, and must be constructed and operated in a specific orientation, which thus may not be understood as limiting the present application. In addition, the terms "first", "second", "third" and the like are only intended for a purpose of description, and shall not be understood as an indication or implication of relative importance. "Vertical" is not strictly vertical, but within the allowable range of error. "Parallel" is not strictly parallel, but within the allowable range of error.

The orientation words in the following description are the directions shown in the figures, which are not intended to limit the specific structure of the present application. In the description of the present application, it should be also noted that, unless otherwise explicitly specified and defined, the terms "mounting", "connecting", "connection" and "attaching" should be understood in a broad sense, for example, they may be a fixed connection, a detachable connection, or an integrated connection; they may be a direct connection and may also be an indirect connection via an intermediate medium. Those of ordinary skill in the art can understand the specific meanings of the foregoing terms in the present application according to specific conditions.

In the present application, a battery cell may include a primary battery and a secondary battery, such as a lithium-ion battery, a lithium-sulfur battery, a sodium/lithium-ion battery, a sodium-ion battery or a magnesium-ion battery, etc., which are not limited by the embodiments of the present application. The battery cell may be cylindrical, flat, cuboid or in another shape, which are not limited by the embodiments of the present application. The battery cell is generally divided into three types according to the way of packaging: a cylindrical battery cell, a prismatic battery cell and a pouch battery cell, which are not limited by the embodiments of the present application.

The battery mentioned in the embodiments of the present application refers to a single physical module that includes one or more battery cells to provide a higher voltage and capacity. For example, the battery mentioned in the present application may include a battery module, a battery pack or the like. The battery pack generally includes a box for encapsulating one or more battery cells. The box can prevent liquid or other foreign matters from affecting the charging or discharging of the battery cell.

The battery cell includes an electrode assembly and an electrolytic solution, and the electrode assembly includes a positive electrode sheet, a negative electrode sheet and a separator. The operation of the battery cell mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, the current collector not coated with the positive electrode active material layer protrudes from the current collector coated with the positive electrode active material layer, and the current collector not coated with the positive electrode active material layer is used as a positive tab. In an example of a lithium-ion battery, a material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, the current collector not coated with the negative electrode active material layer protrudes from the current collector coated with the negative electrode active material layer, and the current collector not coated with the negative electrode active material layer is used as the negative tab. A material of the negative electrode current collector may be copper, and the negative electrode active material may be carbon, silicon, or the like. In order to ensure that no fusing occurs when a large current passes, there are a plurality of positive tabs which are stacked together, and there are a plurality of negative tabs which are stacked together. A material of the separator may be PP, PE, or the like. In addition, the electrode assembly may have a winding structure or a laminated structure, and the embodiments of the present application are not limited thereto. With the development of the battery technology, it is necessary to consider design factors in multiple aspects simultaneously, such as energy density, cycle life, discharge capacity, C-rate and other performance parameters. In addition, safety of battery should also be considered.

With respect to the battery, the main safety hazard comes from the charging and discharging process, and in order to improve the safety performance of the battery, the battery cell is generally provided with a pressure relief mechanism. The pressure relief mechanism refers to an element or component that is actuated when an internal pressure or temperature of the battery cell reaches a predetermined threshold, to relieve the internal pressure or temperature. The predetermined threshold may be adjusted according to different design requirements. The predetermined threshold may depend on the material of one or more of the positive electrode sheet, the negative electrode sheet, the electrolytic solution and the separator in the battery cell. The pressure relief mechanism may adopt such as a pressure-sensitive or temperature-sensitive element or component, that is, when the internal pressure or temperature of the battery cell reaches the predetermined threshold, the pressure relief mechanism is actuated, thereby forming a channel for internal pressure or temperature relief.

The "actuation" mentioned in the present application means that the pressure relief mechanism acts, so that the internal pressure and temperature of the battery cell can be relieved. The action generated by the pressure relief mechanism may include but be not limited to: at least a portion of the pressure relief mechanism being fractured, torn or melted, and so on. After the pressure relief mechanism is actuated, high-temperature and high-pressure substances inside the battery cell are discharged as emissions from the pressure relief mechanism. In this way, the pressure of the battery cell can be relieved at a controllable pressure or temperature, thereby avoiding potentially more serious accidents.

The emissions from the battery cell mentioned in the present application include but are not limited to: the electrolytic solution, the dissolved or split positive and negative electrode sheets, fragments of the separator, high-temperature and high-pressure gas generated by reaction, flame, etc.

The pressure relief mechanism on the battery cell has an important impact on the safety of the battery. For example, when short circuit, overcharge and other phenomena occur in the battery cell, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, that is, to discharge the emissions to the outside of the battery cell. However, in order to ensure an output voltage or current of the battery, a plurality of battery cells are often required and electrically connected to each other via a bus component. The emissions discharged from the interior of the battery cell may cause short circuit of the other battery cells. For example, when discharged metal scraps electrically connect two bus components, the battery is short-circuited, thereby posing a potential safety hazard. Moreover, the high-temperature and high-pressure emissions are discharged in a direction in which a pressure relief mechanism of the battery cell is provided, and more specifically, may be discharged in a direction of a region where the pressure relief mechanism is actuated. The strength and destructive power of such emissions may be great, or may even be enough to break through one or more structures in this direction, causing further safety problems.

In view of this, according to the embodiments of the present application, a thermal management component is arranged in the battery, the surface of the thermal management component is attached to the surface of the battery cell provided with the pressure relief mechanism, and a pressure relief area may also be disposed on the thermal management component, for example, the pressure relief area may be a pressure relief hole.

On the one hand, the thermal management component is configured to accommodate a fluid to adjust temperature of a plurality of battery cells. The fluid here may be liquid or gas, and temperature adjustment means heating or cooling the plurality of battery cells. In a case of cooling or lowering the temperature of the battery cells, the thermal management component is configured to accommodate a cooling fluid to lower the temperature of the plurality of battery cells. In this case, the thermal management component may also be called a cooling component, a cooling system or a cooling plate, etc. The fluid accommodated by the thermal management component may also be called a cooling medium or a cooling fluid, and more specifically, may be called a cooling liquid or a cooling gas. In addition, the thermal management component can also be configured to heat to raise the temperature of the plurality of battery cells, which is not limited by the embodiments of the present application. Optionally, the fluid can flow in a circulating manner to achieve better temperature adjustment effect. Optionally, the fluid may be water, a mixture of water and ethylene glycol, or air, etc.

On the other hand, when the pressure relief mechanism is actuated, the emissions discharged from the battery cell can be discharged through the pressure relief hole of the thermal management component, and the thermal management component can also cool the battery cell to avoid an explosion in the battery cell.

The bus component is configured to implement an electric connection between the plurality of battery cells, such as parallel connection, series connection or series-parallel connection. The bus component may implement an electrical connection between the battery cells by connecting electrode terminals of the battery cells. In some embodiments, the bus component may be fixed to the electrode terminals of the battery cells by means of welding. Corresponding to the "high-voltage chamber", an electrical connection formed by the bus component may also be called "high-voltage connection".

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing apparatuses, but also applicable to all apparatuses using batteries. However, for the sake of brevity, the following embodiments take electric vehicles as an example for description.

For example, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be arranged inside the vehicle 1, and the controller 30 is configured to control the battery 10 to supply power to the motor 40. For example, the battery 10 may be disposed at the bottom or the head or the tail of the vehicle 1. The battery 10 may be configured to supply power to the vehicle 1. For example, the battery 10 may be used as an operation power source of the vehicle 1 for a circuit system of the vehicle 1, for example, for a working power demand of the vehicle 1 during startup, navigation and running. In another embodiment of the present application, the battery 10 may be used not only as an operating power source of the vehicle 1 but also as a driving power source of the vehicle 1, replacing or partially replacing fuel or natural gas to provide driving power for the vehicle 1.

In order to meet different power requirements, the battery may include a plurality of battery cells, where the plurality of battery cells may be in series connection, parallel connection or series-parallel connection. The series-parallel connection refers to a combination of series connection and parallel connection. The battery may also be called a battery pack. Optionally, the plurality of battery cells may be first connected in series, in parallel or in series and parallel to form a battery modules, and then a plurality of battery modules are connected in series, in parallel or in series and parallel to form a battery. That is, the plurality of battery cells may directly form the battery, or may first form battery modules, and then the battery modules form a battery.

Figure 2:
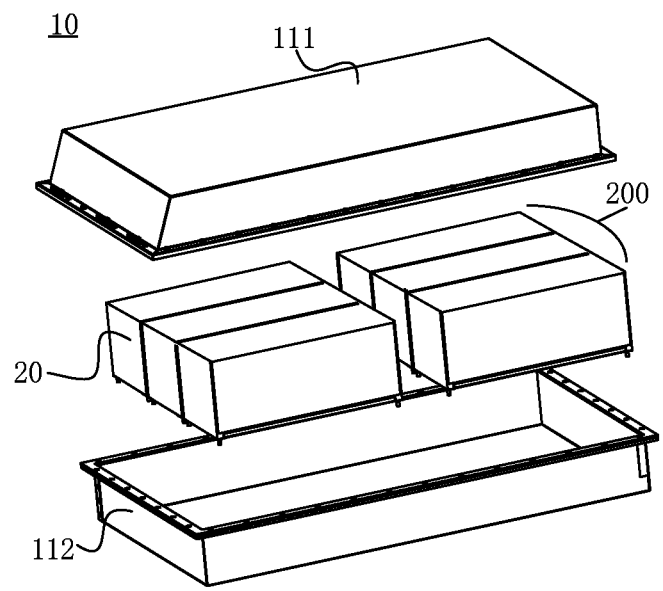
FIG. 2 is a schematic structural diagram of a battery according to an embodiment of the present application.

For example, FIG. 2 is a schematic structural diagram of a battery 10 according to an embodiment of the present application, the battery 10 may include at least one battery module 200. The battery module 200 includes a plurality of battery cells 20. The battery 10 may further include a box, the interior of the box is a hollow structure, and the plurality of battery cells 20 are accommodated in the box. As shown in FIG. 2, the box may include two portions, which are referred to as a first portion 111 and a second portion 112, respectively, and the first portion 111 and the second portion 112 are fastened together. The shapes of the first portion 111 and the second portion 112 may be determined according to the shape of the battery module 200, and at least one of the first portion 111 and the second portion 112 has an opening. For example, as shown in FIG. 2, the first portion 111 and the second portion 112 each may be a hollow cuboid and each have only one face as an opening face, and an opening of the first portion 111 is arranged opposite to an opening of the second portion 112. The first portion 111 and the second portion 112 are fastened to each other to form a box with a closed chamber. For another example, different from that shown in FIG. 2, only one of the first portion 111 and the second portion 112 may be a hollow cuboid with an opening, while the other may be a plate shape, so as to cover the opening. For example, the second portion 112 is a hollow cuboid and has only one face as an opening face and the first portion 111 is a plate shape, then the first portion 111 covers at the opening of the second portion 112 to form a box with a closed chamber, and the chamber may be configured to accommodate the plurality of battery cells 20. The plurality of battery cells 20 are combined in parallel connection or series connection or series-parallel connection and are then placed in the box formed by fastening the first portion 111 to the second portion 112.

Optionally, the battery 10 may also include other structures, which will not be described in detail herein. For example, the battery 10 may also include a bus component. The bus component is configured to implement an electrical connection between the plurality of battery cells 20, such as parallel connection, series connection or series-parallel connection. Specifically, the bus component may implement an electrical connection between the battery cells 20 by connecting electrode terminals of the battery cells 20. Furthermore, the bus component may be fixed to the electrode terminals of the battery cells 20 by means of welding. Electrical energy of the plurality of battery cells 20 can be further led out through an electrically conductive mechanism passing through the box.

Figure 3:
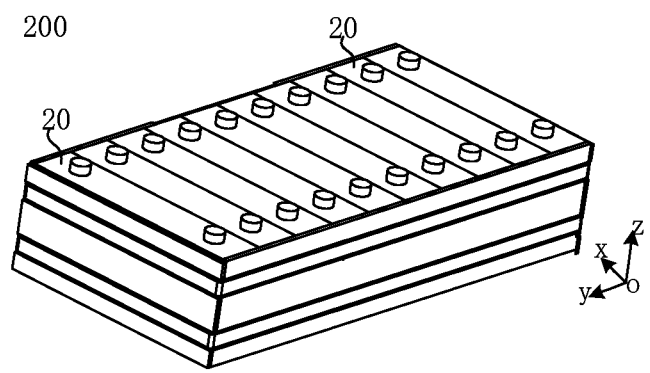
FIG. 3 is a schematic structural diagram of a battery module according to an embodiment of the present application.

According to different power requirements, the number of the battery cells 20 in the battery module 200 may be set to any value. The plurality of battery cells 20 can be connected in series, in parallel or in series and parallel to implement larger capacity or power. Since there may be many battery cells 20 included in each battery 10, the battery cells 20 may be arranged in groups for convenience of installation, and each group of the battery cells 20 constitutes the battery module 200. The number of the battery cells 20 included in the battery module 200 is not limited and may be set as required. For example, FIG. 3 shows an example of a battery module 200. The battery may include a plurality of battery modules 200, and these battery modules 200 may be connected in series, in parallel or in series and parallel.

Figure 4:
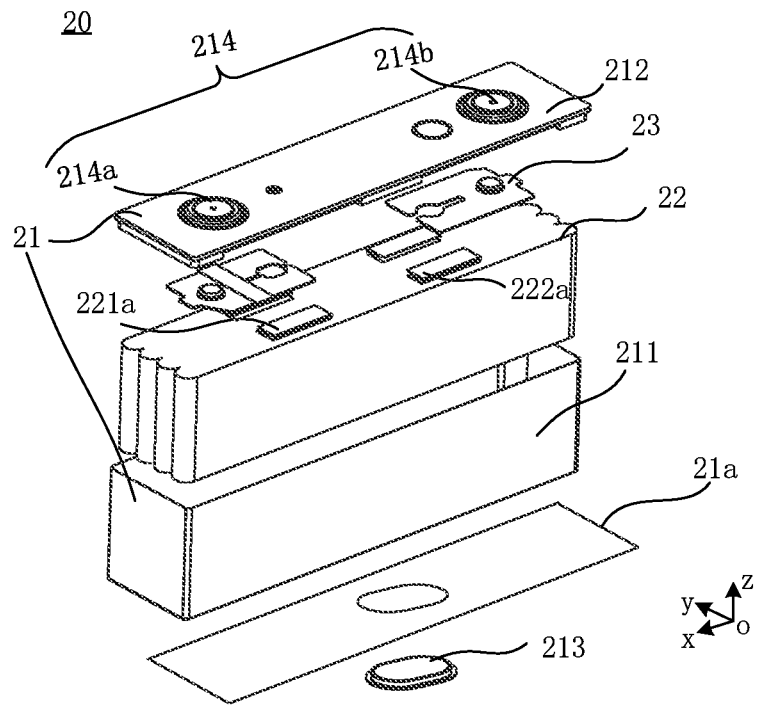
FIG. 4 is an exploded view of a battery cell according to an embodiment of the present application.

FIG. 4 is a schematic structural diagram of a battery cell 20 according to an embodiment of the present application. The battery cell 20 includes one or more electrode assemblies 22, a housing 211 and a cover plate 212. The housing 211 and the cover plate 212 form a shell 21. A wall of the housing 211 and the cover plate 212 are each referred to as a wall of the battery cell 20. The housing 211 is shaped according to the shape of one or more electrode assemblies 22 after combination. For example, the housing 211 may be a hollow cuboid or cube or cylinder, and one face of the housing 211 has an opening so that one or more electrode assemblies 22 can be placed in the housing 211. For example, when the housing 211 is a hollow cuboid or cube, one plane of the housing 211 is an opening face, that is, the plane does not have a wall, so that the inside and outside of the housing 211 are in communication with each other. When the housing 211 is a hollow cylinder, an end face of the housing 211 is an opening face, that is, the end face does not have a wall, so that the inside and outside of the housing 211 are in communication with each other. The cover plate 212 covers the opening and is connected to the housing 211 to form a closed chamber in which the electrode assembly 22 is placed. The housing 211 is filled with an electrolyte, such as an electrolytic solution.

The battery cell 20 may further include two electrode terminals 214, and the two electrode terminals 214 may be disposed on the cover plate 212. The cover plate 212 is generally in the shape of a flat plate, and the two electrode terminals 214 are fixed on a flat plate face of the cover plate 212. The two electrode terminals 214 are a first electrode terminal 214a and a second electrode terminal 214b respectively. Polarities of the two electrode terminals 214 are opposite. For example, when the first electrode terminal 214a is a positive electrode terminal, the second electrode terminal 222a is a negative electrode terminal. Each electrode terminal 214 is correspondingly provided with a connecting member 23, which is located between the cover plate 212 and the electrode assembly 22 and configured to electrically connect the electrode assembly 22 to the electrode terminal 214.

As shown in FIG. 4, each electrode assembly 22 has a first tab 221a and a second tab 222a. The first tab 221a and the second tab 222a have opposite polarities. For example, when the first tab 221a is a positive tab, the second tab 222a is a negative tab. The first tab 221a of the one or more electrode assemblies 22 is connected to one electrode terminal through one connecting member 23, and the second tab 222a of the one or more electrode assemblies 22 is connected to the other electrode terminal through the other connecting member 23. For example, the positive electrode terminal 214a is connected to the positive tab through one connecting member 23, and the negative electrode terminal 214b is connected to the negative tab through the other connecting member 23.

In this battery cell 20, according to actual use requirements, electrode assembly 22 may be set to be single or multiple in number. As shown in FIG. 4, four separate electrode assemblies 22 are disposed in the battery cell 20.

As shown in FIG. 4, a pressure relief mechanism 213 may also be disposed on one wall of the battery cell 20, for example, the pressure relief mechanism 213 may be disposed on a first wall 21a of the battery cell 20. The first wall 21a in FIG. 4 is separated from the housing 211, that is, a bottom side of the housing 211 has an opening, and the first wall 21a covers the opening of the bottom side and is connected to the housing 211. A connection mode can be welding or bonding, or the like. Alternatively, the first wall 21a and the housing 211 may also be an integral structure. The pressure relief mechanism 213 is configured to be actuated when an internal pressure or temperature of the battery cell 20 reaches a threshold to relieve the internal pressure or temperature.

The pressure relief mechanism 213 may be a portion of the first wall 21a or may be a separate structure from the first wall 21a and fixed to the first wall 21a by means of welding, for example. When the pressure relief mechanism 213 is a portion of the first wall 21a, for example, the pressure relief mechanism 213 can be formed by providing an indentation on the first wall 21a, and a thickness of the first wall 21a corresponding to the indentation is smaller than that of other regions of the pressure relief mechanism 213 except the indentation. The indentation is the weakest position of the pressure relief mechanism 213. When excessive gas generated by the battery cell 20 causes an internal pressure of the housing 211 to rise and reach a threshold, or heat generated by an internal reaction of the battery cell 20 causes an internal temperature of the battery cell 20 to rise and reach a threshold, the pressure relief mechanism 213 can be fractured at the indentation, resulting in a communication between the inside and outside of the housing 211. The gas pressure and temperature are released outward through the cracking of the pressure relief mechanism 213, thereby preventing the battery cell 20 from exploding.

Optionally, in an embodiment of the present application, as shown in FIG. 4, in the case where the pressure relief mechanism 213 is disposed on the first wall 21a of the battery cell 20, a second wall of the battery cell 20 is provided with electrode terminals 214 and is different from the first wall 21a.

Optionally, the second wall is arranged opposite to the first wall 21a. For example, the first wall 21a may be a bottom wall of the battery cell 20, and the second wall may be a cover plate 212 of the battery cell 20.

The pressure relief mechanism 213 and the electrode terminals 214 are disposed on different walls of the battery cell 20, so that when the pressure relief mechanism 213 is actuated, the emissions from the battery cell 20 can be farther away from the electrode terminals 214, thereby reducing an impact of the emissions on the electrode terminals 214 and the bus component, thus enhancing the safety of the battery.

Furthermore, when the electrode terminals 214 are disposed on the cover plate 212 of the battery cell 20, the pressure relief mechanism 213 is disposed on the bottom wall of the battery cell 20, so that when the pressure relief mechanism 213 is actuated, the emissions from the battery cell 20 are discharged toward the bottom of the battery 10. In this way, on one hand, a risk resulting from the emissions can be reduced by using the thermal management component at the bottom of the battery 10, and on the other hand, when the battery 10 is arranged in the vehicle, the harm to passengers can be reduced because the bottom of the battery 10 is usually far away from the passengers.

The pressure relief mechanism 213 may be various possible pressure relief structures, which is not limited by the embodiments of the present application. For example, the pressure relief mechanism 213 may be a temperature-sensitive pressure relief mechanism, the temperature-sensitive pressure relief mechanism is configured to be capable of being melted when internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when an internal gas pressure of the battery cell 20 provided with the pressure relief mechanism 213 reaches a threshold.

In order to adjust the temperature of the battery cell 20, the thermal management component may be arranged under the battery cell 20. Specifically, the thermal management component may be configured to accommodate the fluid to adjust the temperature of the battery cell 20, when the pressure relief mechanism 213 is actuated, the thermal management component can cool the emissions from the battery cell 20 provided with the pressure relief mechanism 213.

Optionally, the pressure relief area may be disposed on the thermal management component, for example, the pressure relief area may be the pressure relief hole. In this way, when the pressure relief mechanism 213 is actuated, the pressure relief mechanism 213 is opened to discharge the emissions from the battery cell 20, and the emissions can also pass through the thermal management component by the pressure relief hole to be discharged.

However, when the pressure relief mechanism 213 is actuated and the discharged emissions are discharged through the pressure relief hole of the thermal management component, discharge speed is too fast, which may cause the fluid accommodated in the thermal management component to be unable to effectively cool the emissions. Therefore, how to effectively discharge the emissions and quickly cool the emissions at the same time is a problem that is difficult to solve with a design of the current battery cell 20.

Therefore, the embodiments of the present application provide a battery, which can solve the problem mentioned above.

Figure 5:
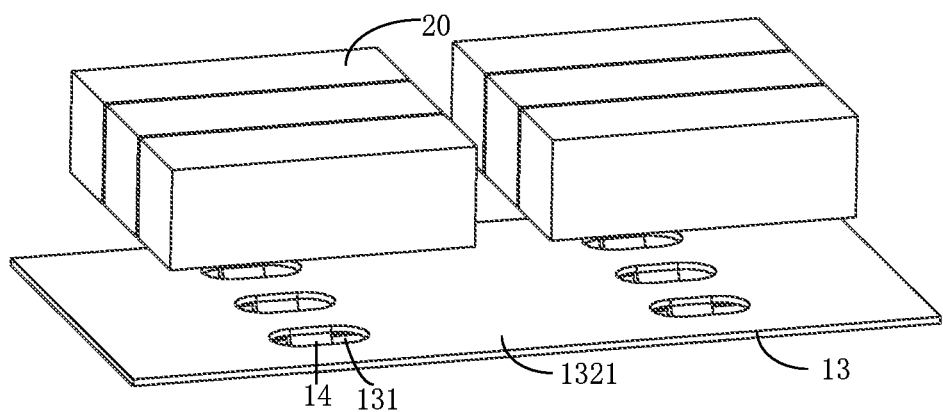
FIG. 5 is an exploded view of a battery cell and a thermal management component according to an embodiment of the present application.

FIG. 5 shows a partial exploded view of the battery 10 according to the embodiments of the present application. As shown in FIG. 5, the battery 10 includes: at least one battery cell 20, and the following battery cell 20 takes any battery cell 20 included in the battery 10 as an example, that is, the battery cell 20 may be the battery cell 20 in FIGS. 1-4, which is applicable to the related description of the battery cell 20 in the above FIGS. 1-4, and for the sake of brevity, it will not be redundantly described herein. Specifically, the battery cell 20 includes a pressure relief mechanism 213, the pressure relief mechanism 213 is disposed on a first wall 21a of the battery cell 20, and the pressure relief mechanism 213 is configured to be actuated when an internal pressure or temperature of the battery cell 20 reaches a threshold, to relieve the internal pressure.

As shown in FIG. 5, the battery 10 further includes: a thermal management component 13, the thermal management component 13 is configured to accommodate a fluid to adjust the temperature of the battery cell 20. The thermal management component 13 is applicable to the related description of the thermal management component in the above, and for the sake of brevity, it will not be redundantly described herein. Specifically, a first surface 1321 of the thermal management component 13 is attached to the first wall 21a of the battery cell 20, and the thermal management component 13 is provided with a pressure relief hole 131 opposite to the pressure relief mechanism 213, so that when the pressure relief mechanism 213 is actuated, the emissions discharged from the battery cell 20 can pass through the thermal management component 13 by the pressure relief hole 131 to be discharged.

In the embodiments of the present application, as shown in FIG. 5, the battery 10 further includes a baffle 14, the baffle 14 is configured to cover a part of the pressure relief hole 131, so that when the pressure relief mechanism 213 is actuated, a discharge direction of the emissions entering the pressure relief hole 131 is changed.

Therefore, for the battery 10 according to the embodiments of the present application, the thermal management component 13 is provided with the baffle 14 for covering a part of the pressure relief hole 131. In this way, when the pressure relief mechanism 213 is actuated and the emissions discharged from the battery cell 20 enter the pressure relief hole 131, the emissions may directly contact the baffle 14 and reflect on the surface of the baffle 14 before passing through the pressure relief hole 131 or after passing through the pressure relief hole 131, thereby changing an original discharge direction of the emissions, so that more high temperature emissions impact the thermal management component 13. In this way, the thermal management component 13 could cool more emissions. In addition, more high temperature emissions could also widen an area of the thermal management component 13 melted by the high temperature emissions, and the thermal management component 13 could be more fully damaged by the high temperature emissions, which ensures that sufficient fluid in the thermal management component 13 could smoothly flow out, so as to achieve a better cooling effect, this avoids, as far as possible, a case where the high temperature emissions directly pass through the pressure relief hole 131 and could not impact or melt the thermal management component 13.

It should be understood that the thermal management component 13 according to the embodiments of the present application is configured to accommodate the fluid to adjust the temperature of the plurality of battery cells 20. In the case of lowering the temperature of the battery cells 20, the thermal management component 13 may accommodate a cooling medium to adjust the temperature of the plurality of battery cells 20. In this case, the thermal management component 13 may also be called a cooling component, a cooling system or a cooling plate, etc. In addition, the thermal management component 13 may also be configured to heat, which is not limited by the embodiments of the present application. Optionally, the fluid can flow in a circulating manner to achieve a better temperature adjustment effect.

Figure 6:
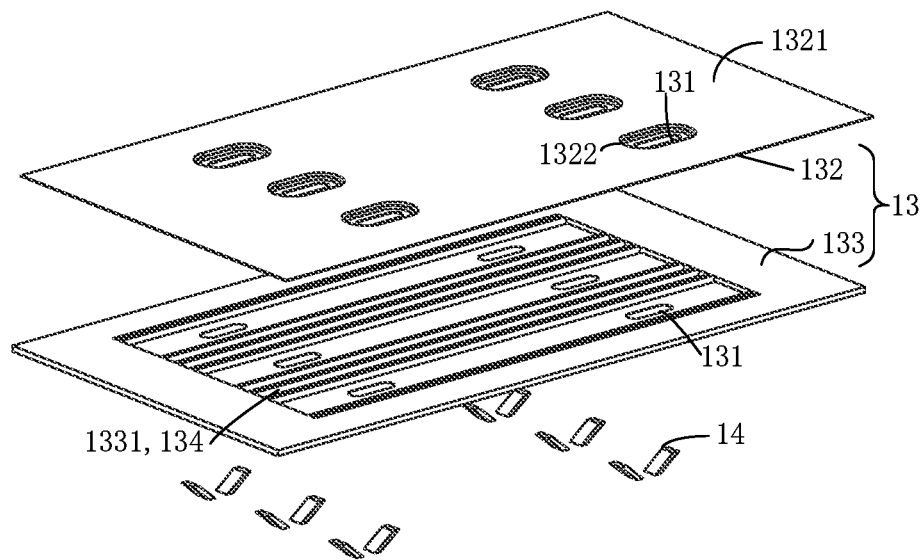
FIG. 6 is an exploded view of a thermal management component and a baffle according to an embodiment of the present application.
Figure 7:
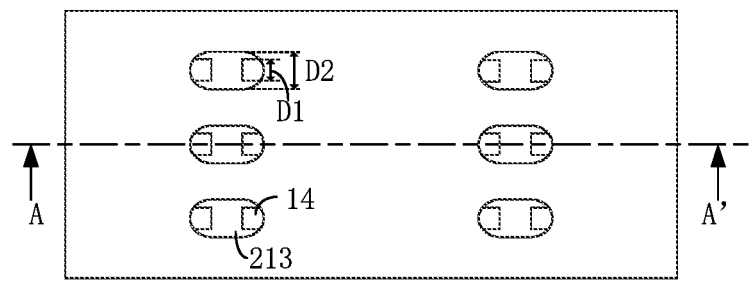
FIG. 7 is a top view of a thermal management component provided with a baffle according to an embodiment of the present application.
Figure 8:
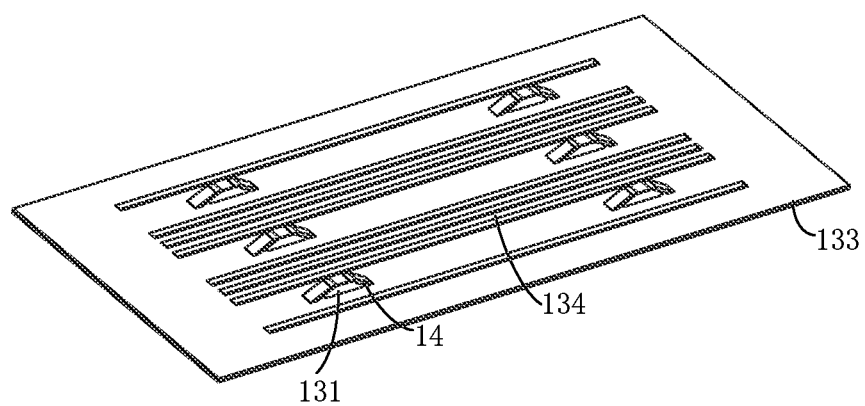
FIG. 8 is a bottom view of a thermal management component provided with a baffle according to an embodiment of the present application.

FIG. 6 is an exploded view of the thermal management component 13 according to the embodiments of the present application, FIG. 7 is a top view of the thermal management component 13 according to the embodiments of the present application, and FIG. 8 is a bottom view of the thermal management component 13 according to the embodiments of the present application. As shown in FIGS. 6-8, the thermal management component 13 according to the embodiments of the present application may be provided with a flow channel 134, the flow channel 134 is configured to accommodate the fluid. In this way, when the pressure relief mechanism 213 is actuated, the emissions discharged from battery cell 20 by the pressure relief mechanism 213 may damage the flow channel 134, so that the fluid in the flow channel 134 flows out, thereby cooling the emissions.

Specifically, as shown in FIGS. 6-8, the thermal management component 13 may include a first thermal conductive plate 132 and a second thermal conductive plate 133. The first thermal conductive plate 132 is arranged between the second heat conduction plate 133 and the first wall 21a of the battery cell 20, the first thermal conductive plate 132 is attached to the first wall 21a, and the first thermal conductive plate 132 is connected to the second heat conduction plate 133, where an upper surface of the first thermal conductive plate 132 is the first surface 1321 of the thermal management component 13, the first surface 1321 is attached to the first wall 21a of the battery cell 20.

It should be understood that in the embodiments of the present application, the first surface 1321 is attached to the first wall 21a of the battery cell 20, which may be that the first surface 1321 directly contacts the first wall 21a, or the first surface 1321 contacts the first wall 21a through a thermal glue or other substances, so as to implement a heat exchange between the first surface 1321 and the first wall 21a of the battery cell 20.

For the pressure relief hole 131 disposed on the thermal management component 13, as shown in FIGS. 6-8, through holes corresponding to each other may be disposed on the first thermal conductive plate 132 and the second thermal conductive plate 133 respectively, so as to form the pressure relief hole 131, that is, the pressure relief hole 131 penetrates the first thermal conductive plate 132 and the second thermal conductive plate 133 respectively.

Optionally, as shown in FIG. 6, the first thermal conductive plate 132 may further include a second groove 1322 with an opening facing away from a direction of the second thermal conductive plate 133. A through hole is disposed on a bottom wall of the second groove 1322 to form the pressure relief hole 131 on the first thermal conductive plate 132. An aperture of the second groove 1322 may gradually increase along a direction away from the second thermal conductive plate 133, that is, a wall of the second groove 1322 is inclined with respect to the axis of the pressure relief hole 131, so that when a thermal runaway occurs in the battery cell 20, the emissions discharged through the pressure relief mechanism 213 can more contact a side wall of the second groove 1322, and more emissions can be cooled by the thermal management component 13. For example, the side wall of the second groove 1322 can be set as a wall of the flow channel 134, so when the emissions contact the side wall of the second groove 1322, liquids in the flow channel 134 may cool the emissions, furthermore, the emissions may also melt the side wall of the second groove 1322, so that the fluid in the flow channel 134 flows out, thereby cooling the emissions.

The flow channel 134 disposed on the thermal management component 13 may be implemented by arranging a groove on the second thermal conductive plate 133 or the first thermal conductive plate 132. Specifically, taking the groove disposed on the second thermal conductive plate 133 as an example, as shown in FIGS. 6-8, the second thermal conductive plate 133 is provided with a first groove 1331 with an opening facing the first thermal conductive plate 132. When the first thermal conductive plate 132 is adhered to the second thermal conductive 133, the first thermal conductive plate 132 covers an opening of the first groove 1331 to form a hollow structure, and the hollow structure is the flow channel 134.

Optionally, a shape, a size and a position of the flow channel 134 in the embodiments of the present application may be flexibly set according to actual applications. For example, the flow channels 134 in FIG. 6 and FIG. 8 are set to strip, but the size of the flow channels 134 at different positions in FIG. 6 and FIG. 8 may be different. The embodiments of the present application is not limited thereto.

Considering that the emissions passing through the pressure relief mechanism 213 are discharged through the pressure relief hole 131 on the thermal management component 13, in order to enable the fluid in the thermal management component 13 to better cool the emissions, or furthermore, in order to enable the thermal management component 13 to be damaged by the emissions to allow an internal fluid to be smoothly discharged, the flow channel 134 on the thermal management component 13 is usually arranged around the pressure relief hole 131, so that the emissions passing through the pressure relief hole 131 can directly contact the flow channel 134, so as to be cooled by the fluid in the flow channel 134. Furthermore, the flow channel 134 can be damaged in a large area when the emissions contact the flow channel 134, so that more fluid in the flow channel 134 can be smoothly discharged.

In addition, in order to enable the thermal management component 13 to be easily damaged, the thermal management component 13 may also be provided with a temperature-sensitive material, the temperature-sensitive material can be melted by the emissions from the battery cell 20 when the pressure relief mechanism 213 is actuated, so that the internal fluid is discharged from the interior of the thermal management component 13.

Optionally, the temperature-sensitive material can be disposed on an area of the thermal management component 13 facing the emissions from the battery cell 20. For example, the temperature-sensitive material may arranged around the pressure relief hole 131 on the first surface 1321 of the thermal management component 13. For another example, the temperature-sensitive material may also be disposed on the hole wall of the pressure relief hole 131, and an area on which the temperature-sensitive material is arranged may be the wall of the flow channel 134, so that the emissions discharged from the battery cell 20 directly contact the temperature-sensitive material and melt the temperature-sensitive material, so as to enable the thermal management component 13 to be damaged, for example, the flow channel 134 of the thermal management component 13 is damaged, and the internal fluid thereof flows out to cooling the emissions.

In order to ensure that when the pressure relief mechanism 213 is actuated, the emissions from the battery cell 20 may contact or damage an area of the flow channel as large as possible, the battery 10 according to the embodiments of the present application further includes a baffle 14 to change the discharge direction of the emissions entering the pressure relief hole 131.

Specifically, as shown in FIGS. 6-8, the baffle 14 may be arranged at any position around the pressure relief hole 131, so that the baffle 14 covers a part of the pressure relief hole 131. For example, a ratio of an area of the baffle 14 covering the pressure relief hole 131 to a total area of the pressure relief hole 131 usually ranges from 0.5 to 0.8, but the embodiments of the present application are not limited thereto. For example, taking the arranged baffle 14 as shown in FIG. 7 as an example, a width D1 of the baffle 14 may be equal to or less than or greater than a width D2 of the pressure relief hole 131, In addition, the number and position of the baffle 14 according to the embodiments of the present application may be flexibly set according to actual applications, for example, FIGS. 6-8 all take each pressure relief hole 131 corresponding to two baffles 14 arranged as an example. However, more or fewer baffles may also be arranged, and the embodiments of the present application are not limited thereto.

The following describes an arrangement of the baffle 14 with reference to the accompanying drawings.

Figure 9:
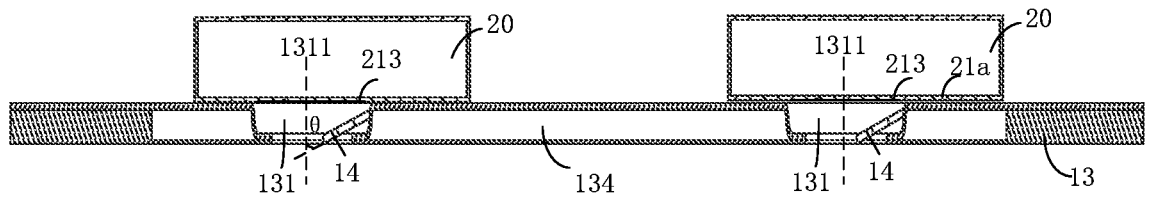
FIG. 9 is a cross-sectional view of a battery cell, a thermal management component and a baffle according to an embodiment of the present application.

FIG. 9 shows a cross-sectional view of a battery cell 20 and a thermal management component 13 along an A-A' direction shown in FIG. 7. FIG. 9 takes only one baffle arranged in each pressure relief hole 131 as an example.

Figure 10:
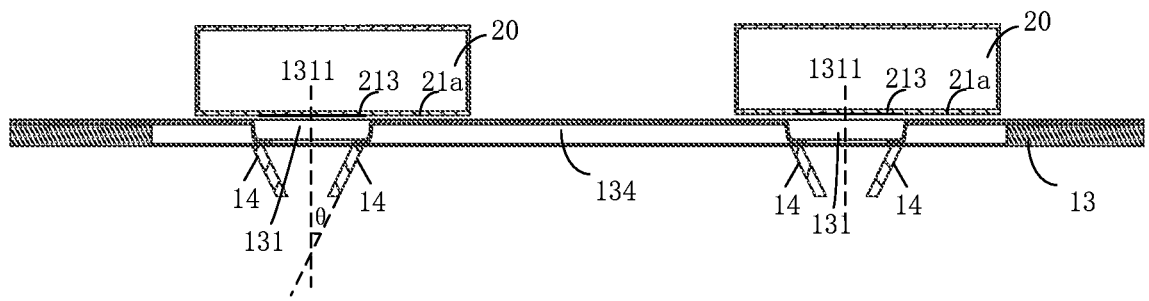
FIG. 10 is a cross-sectional view of another battery cell, thermal management component and baffle according to an embodiment of the present application.

FIG. 10 shows a cross-sectional view of another battery cell 20 and thermal management component 13 along the A-A' direction shown in FIG. 7, and FIG. 10 takes only two baffles 14 arranged in the each pressure relief hole 131 as an example. As shown in FIG. 9 and FIG. 10, the baffle 14 according to the embodiments of the present application may be located on the second surface of the thermal management component 13, and the second surface may be any surface of the thermal management component 13, that is, the baffle 14 may be arranged inside or outside the pressure relief hole 131. For example, the baffle 14 in FIG. 9 is arranged inside the pressure relief hole 131, and the baffle 14 is connected to the first thermal conductive plate 132 of the thermal management component 13, that is, the baffle 14 is arranged on the hole wall of the pressure relief hole 131; while the baffle 14 in FIG. 10 is arranged outside the pressure relief hole 131, and the baffle 14 is connected to the second thermal conductive plate 133 of the thermal management 13. The embodiments of the present application are not limited thereto.

In some embodiments, a maximum distance between the baffle 14 and the first wall 21a of the battery cell 20 is greater than a minimum distance from the flow channel 134 to the first wall 21a, so as to ensure that the emissions can reflect on the surface of the baffle 14 to change the discharge direction thereof, so that the reflected emissions can face the thermal management component 13, and more emissions can contact the thermal management component 13 in order to achieve an effect of cooling more emissions by the thermal management component 13. Furthermore, the discharge direction of the emissions is changed by the baffle 14 to enable more emissions to impact the thermal management component 13, which may cause the flow channel 134 on the thermal management component 13 is damaged, so that the fluid in the flow channel 134 flows out to cool the emissions.

Specifically, the baffle 14 according to the embodiments of the present application is generally arranged in an inclined way with respect to an axis 1311 of the pressure relief hole 131. As shown in FIG. 9 and FIG. 10, the baffle 14 is inclined with respect to the axis 1311 of the pressure relief hole 131. In a direction away from the first wall 21a, the baffle 14 gradually approaches the axis 1311 of the pressure relief hole 131, so that when the pressure relief mechanism 213 is actuated, the emissions can be reflected by the baffle 14 and impact toward the hole wall of the pressure relief hole 131, which enable more emissions to impact the thermal management component 13. Furthermore, the emissions may more fully contact the thermal management component 13, which is more conducive to cooling.

Optionally, when the baffle 14 according to the embodiments of the present application is arranged in the inclined way with respect to the axis 1311 of the pressure relief hole 131, an angle θ between the baffle 14 and the axis 1311 of the pressure relief hole 131 can be set according to actual applications. However, if the angle θ is set too large, an area of the baffle 14 covering the pressure relief hole 131 will be too large and the pressure relief hole 131 will be blocked, affecting the passage of the emissions discharged from the battery cell 20 when the pressure relief mechanism 213 is actuated, which may result in poor exhaust and further cause the battery cell 20 to explode. On the contrary, if the angle θ is set too small, a reflection effect of the emissions on the surface of the baffle 14 will be affected. Therefore, a value of the angle θ is usually set to be from 20° to 40° to achieve an optimal effect.

A material of the baffle 14 in the embodiments of the present application can be flexibly set according to actual applications. For example, the baffle 14 can be made of the same material as the thermal management component 13, for example, both can be made of aluminum alloy materials, and the baffle 14 and the thermal management component 13 can be fixed by means of welding.

In addition, the surface of the baffle 14 in the embodiments of the present application should be set to a relatively smooth surface, an excessively rough surface may allow high temperature particles in the emissions to accumulate on the surface of the baffle 14 and not to rebound, thereby affecting the effect of the baffle 14. For example, a surface roughness of the baffle 14 may be set to be less than or equal to 0.1 μm, and the surface roughness may be the contour arithmetic mean deviation (Ra), but the embodiments of the present application are not limited thereto.

Optionally, the battery 10 according to the embodiments of the present application may further include an electrical chamber 11a and a collection chamber 11b. The battery 10 provided with the electrical chamber 11a, the collection chamber 11b and the thermal management component 13 will be described in detail in the following with reference to the accompanying drawings.

Figure 11:
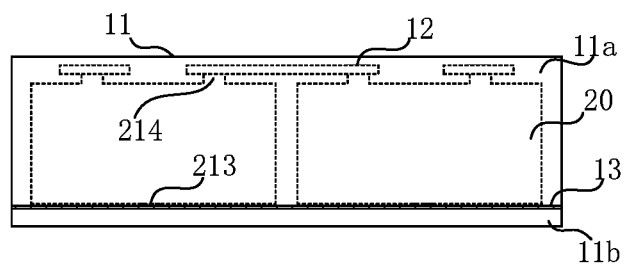
FIG. 11 is a schematic structural diagram of a battery according to an embodiment of the present application.

FIG. 11 is a schematic structural diagram of a box 11 of the battery 10 according to an embodiment of the present application. As shown in FIG. 11, the box 11 according to the embodiments of the present application may include the electrical chamber 11a, the collection chamber 11b, and the thermal management component 13. The thermal management component 13 is configured to isolate the electrical chamber 11a from the collection chamber 11b. The so-called "isolation" here refers to separation, which may not be sealed.

The electrical chamber 11a is configured to accommodate the plurality of battery cells 20 and a bus component 12. The electrical chamber 11a provides an accommodation space for the battery cells 20 and the bus component 12, and a shape of the electrical chamber 11a may be determined according to the plurality of battery cells 20 and the bus component 12.

The bus component 12 is configured to implement the electrical connection between the plurality of battery cells 20. The bus component 12 may implement an electrical connection between the battery cells 20 by connecting electrode terminals 214 of the battery cells 20.

At least one battery cell 20 of the plurality of battery cells 20 may include a pressure relief mechanism 213. The pressure relief mechanism 213 is configured to be actuated when an internal pressure or temperature of the battery cell 20 provided with the pressure relief mechanism 213 reaches a threshold, to relieve the internal pressure or temperature.

For convenience of description, the battery cell 20 involved in the following description of the pressure relief mechanism 213 refers to the battery cell 20 provided with the pressure relief mechanism 213. For example, the battery cell 20 may be the battery cell 20 in FIG. 4.

The collection chamber 11b is configured to collect the emissions from the battery cell 20 provided with the pressure relief mechanism 213 when the pressure relief mechanism 213 is actuated.

In the embodiments of the present application, the thermal management component 13 is configured to isolate the electrical chamber 11a from the collection chamber 11b. That is, the electrical chamber 11a for accommodating the plurality of battery cells 20 and the bus component 12 is separated from the collection chamber 11b for collecting the emissions. In this way, when the pressure relief mechanism 213 is actuated, the emissions from the battery cells 20 enter the collection chamber 11b, and do not enter the electrical chamber 11a, or enter the electrical chamber 11a in a small amount, so that the electrical connection in the electrical chamber 11a is not affected, thereby enhancing the safety of the batteries.

Optionally, in an embodiment of the present application, the thermal management component 13 has a wall shared by the electrical chamber 11a and the collection chamber 11b. As shown in FIG. 11, the thermal management component 13 may be both a wall of the electrical chamber 11a and a wall of the collection chamber 11b. That is, the thermal management component 13 (or a portion thereof) can be directly used as a wall shared by the electrical chamber 11a and the collection chamber 11b. In this way, the emissions from the battery cells 20 may enter the collection chamber 11b through the thermal management component 13. Besides, due to the existence of the thermal management component 13, the emissions may be isolated from the electrical chamber 11a as far as possible, thereby reducing the risk of the emissions and enhancing the safety of the batteries.

Figure 12:
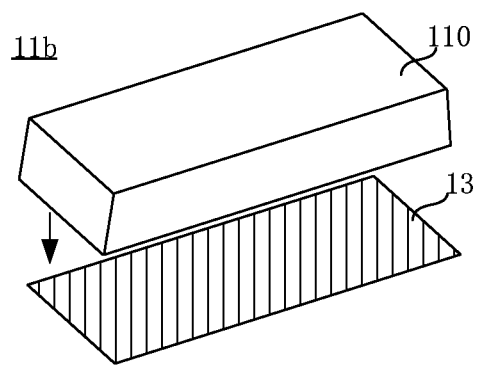
FIG. 12 is an exploded view of an electrical chamber according to an embodiment of the present application.

Optionally, in an embodiment of the present application, the electrical chamber 11a may be composed of a covering having an opening, and the thermal management component 13. For example, FIG. 12 shows an exploded view of an electrical chamber 11a according to the embodiments of the present application. As shown in FIG. 12, the box 11 may include a covering 110 with an opening (for example, the lower opening in FIG. 12). The covering 110 with the opening is a semi-closed chamber with an opening in communication with the outside, and the thermal management component 13 covers the opening to form a chamber, that is, the electrical chamber 11a.

Figure 13:
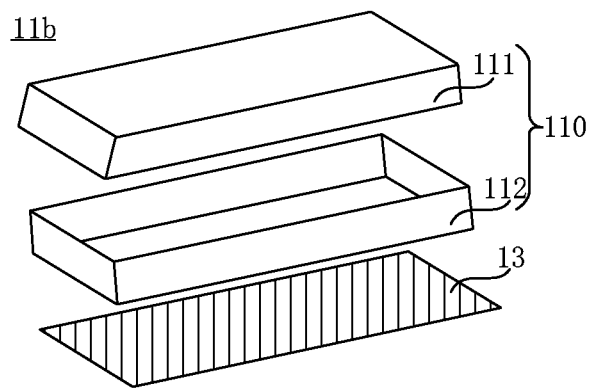
FIG. 13 is an exploded view of another electrical chamber according to an embodiment of the present application.

Optionally, the covering 110 may also be composed of multiple portions, for example, FIG. 13 shows another exploded view of an electrical chamber 11a according to the embodiments of the present application, and the covering 110 may include a first portion 111 and a second portion 112. Two sides of the second portion 112 have openings respectively, that is, the second portion 112 only has surrounding walls. The first portion 111 covers the opening on one side of the second portion 112, and the thermal management component 13 covers the opening on the other side of the second portion 112, thus forming the electrical chamber 11a.

The embodiments of FIG. 13 may be obtained through improvements on the basis of FIG. 2. Specifically, a bottom wall of the second portion 112 in FIG. 2 may be replaced with the thermal management component 13, and the thermal management component 13 acts as a wall of the electrical chamber 11a, thus forming the electrical chamber 11a in FIG. 13. In other words, the bottom wall of the second portion 112 in FIG. 2 may be removed. That is, an annular wall with openings on both sides is formed, and the first portion 111 and the thermal management component 13 cover the openings on the two sides of the second portion 112 respectively to form a chamber, namely the electrical chamber 11a.

Figure 14:
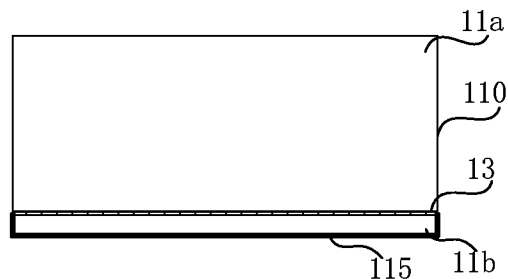
FIG. 14 is a schematic structural diagram of a box of the battery according to an embodiment of the present application.
Figure 15:
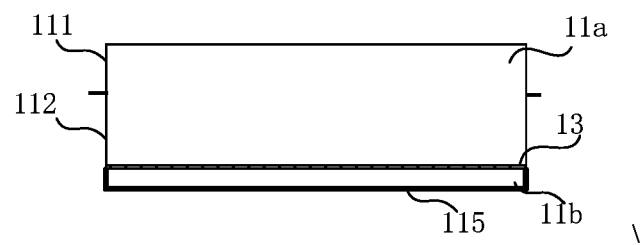
FIG. 15 is a schematic structural diagram of another box of the battery according to an embodiment of the present application.

Optionally, in an embodiment of the present application, the collection chamber 11b may be composed of the thermal management component 13 and the protective member. For example, FIG. 14 shows a schematic diagram of a box 11 according to the embodiments of the present application, where the electrical chamber 11b shown in FIG. 14 is the electrical chamber 11b shown in FIG. 12. FIG. 15 shows another schematic diagram of a box 11 according to the embodiments of the present application, where the electrical chamber 11*b* shown in FIG. 15 is the electrical chamber 11*b* shown in FIG. 13 As shown in FIG. 14 and FIG. 15, the box 11 further includes a protective member 115. The protective member 115 is configured to protect the thermal management component 13, and the protective member 115 and the thermal management component 13 form the collection chamber 11*b*.

The collection chamber 11*b* formed by the protective member 115 and the thermal management component 13 does not occupy a space that may accommodate the battery cell. Therefore, the collection chamber 11*b* with a larger space therein can be arranged, which may effectively collect and buffer the emissions and reduce the risk resulting therefrom.

Optionally, in an embodiment of the present application, a fluid, such as a cooling medium, or a component for accommodating the fluid may be further arranged in the collection chamber 11*b* to further cool the emissions entering the collection chamber 11*b*.

Optionally, in an embodiment of the present application, the collection chamber 11*b* may be a sealed chamber. For example, the connection between the protective member 115 and the thermal management component 13 may be sealed by a sealing member.

Optionally, in an embodiment of the present application, the collection chamber 11*b* may not be a sealed chamber. For example, the collection chamber 11*b* may be in communication with external air, so that part of the emissions can be further discharged to the outside of the box 11.

In the foregoing embodiment, the thermal management component 13 covers the opening of the covering 110 to form an electrical chamber 11*a*, and the thermal management component 13 and the protective member 115 form the collection chamber 11*b*. Optionally, the thermal management component 13 may also directly separate the closed box 11 into the electrical chamber 11*a* and the collection chamber 11*b*, without arranging an additional protective member 115.

For example, in an embodiment of the present application, taking FIG. 13 as an example, the covering 110 may include the first portion 111 and the second portion 112, where the first portion 111 and the second portion 112 both are cavity structures with an opening on one side and can respectively form a semi-closed structure. The thermal management component 13 can be arranged inside the second portion 112, and the first portion 111 covers the opening of the second portion 112. In other words, the thermal management component 13 can be first arranged in the semi-closed second portion 112 to isolate the collection chamber 11*b*, and then the first portion 111 covers the opening of the second portion 112 to form the electrical chamber 11*a*. In this way, with respect to FIG. 15, it can be seen that the bottom wall of the second part 112 can replace the protective member 115 to form the collection chamber 11*b*.

Hereinafter, for convenience of explanation, a case where the collection chamber 11*b* is formed by the protective member 115 is taken as an example for description.

Optionally, when the baffle 14 is arranged in a manner shown in FIG. 10, an end of the baffle 14 away from the thermal management component 13 may abut against the protective member 115.

Figure 16:
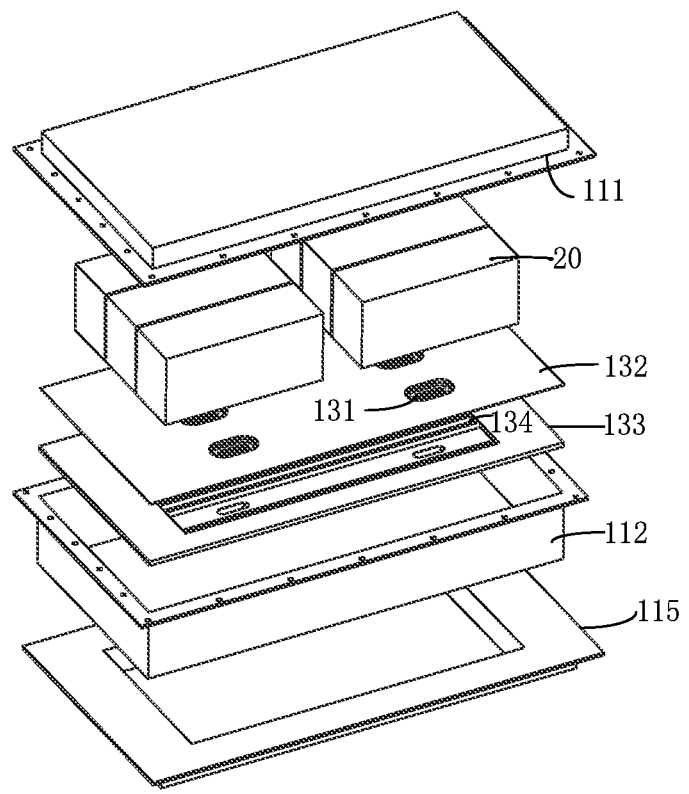
FIG. 16 is an exploded view of a battery according to an embodiment of the present application.
Figure 17:
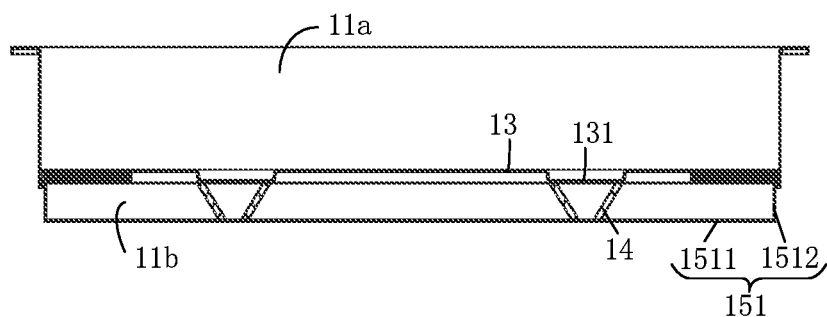
FIG. 17 is a cross-sectional view of a thermal management component, a baffle and a protective member according to an embodiment of the present application.

FIG. 16 shows an exploded view of a battery 10 having a protective member 115 according to the embodiments of the present application, and FIG. 17 shows a cross-sectional view of a protective member 115 and a thermal management component 13. As shown in FIG. 16 and FIG. 17, the protective member 115 and the thermal management component 13 form the collection chamber 11*b*, where the protective member 115 includes a bottom wall 1511 and a plurality of side walls 1512 to form a hollow structure with an opening at one end, and the thermal management component 13 covers the opening to form the collection chamber 11*b*.

When the baffle 14 extends at least partially outside the pressure relief hole 131, an end of the baffle 14 away from the first wall 21*a* abuts against the bottom wall 1511 of the protective member 115 in a direction along the axis 1311 of the pressure relief hole 131. For example, as shown in FIG. 17, the baffle 14 may extend from the thermal management component 13 to the protection member 115, and an end of the baffle 14 away from the thermal management component 13 abuts against the bottom wall 1511 of the protection member 115.

The baffle 14 abuts against the bottom wall of the protective member 115 to support the thermal management component 13 and maintain a distance between the thermal management component 13 and the protective member 115, so that a space of the collection chamber 11*b* is not being squeezed and deformed, thus decreasing a possibility of explosion of the battery 10 caused by compression of the space of the collection chamber 11*b*. In addition, in a case where two baffles 14 are arranged opposite to each other in each pressure relief hole 131, if a lower end of the baffle 14 abuts against the bottom wall 1511 of the protective member 115, after the high temperature emissions pass through the pressure relief hole 131, the emissions may be divided into two opposite channels for discharge under an action of the baffle 14. In particular, high temperature gas in the high temperature emission may be centrally divided into two channels by the baffle 14 after entering the collection chamber 11*b*, which further increases a possibility of the high temperature gas melting the second thermal conductive plate 133 of the thermal management component 13, so that the thermal management component 13 can be damaged in a large area and an internal fluid thereof flows out in large quantities, improving a cooling effect.

A battery and a power consumption device according to the embodiments of the present application are described above, a method and a device for producing the battery according to the embodiments of the present application will be described below. For the parts that are not described in detail, reference is made to the foregoing embodiments.

Figure 18:
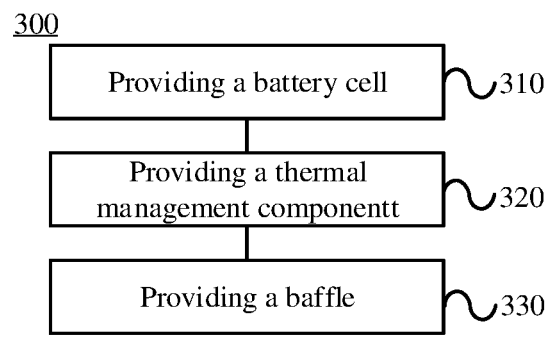
FIG. 18 is a schematic flowchart of a method for producing a battery according to an embodiment of the present application.

FIG. 18 shows a schematic flowchart of a method 300 for producing a battery according to an embodiment of the present application. As shown in FIG. 18, the method 300 may include the following steps: S310, providing a battery cell, where in the battery cell includes a pressure relief mechanism, the pressure relief mechanism is disposed on a first wall of the battery cell and the pressure relief mechanism is configured to be actuated when an internal pressure or temperature of the battery cell reaches a threshold, to relieve the internal pressure; S320, providing a thermal management component, where in the thermal management component is configured to accommodate a fluid to adjust a temperature of the battery cell, a first surface of the thermal management component is attached to the first wall, and the thermal management component is provided with a pressure relief hole opposite to the pressure relief mechanism, so that when the pressure relief mechanism is actuated, emissions discharged from the battery cell can pass through the thermal management component by the pressure relief hole to be discharged; and S330, providing a baffle, the baffle being configured to cover a part of the pressure relief hole, so that when the pressure relief mechanism is actuated, a discharge direction of the emissions entering the pressure relief hole is changed.

Figure 19:
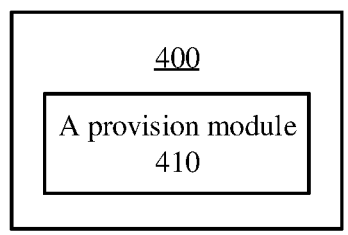
FIG. 19 is a schematic block diagram of a device for producing a battery according to an embodiment of the present application.

FIG. 19 shows a schematic block diagram of a device 400 for producing a battery according to an embodiment of the present application. As shown in FIG. 19, the device 400 may include: a provision module 410. The provision module 410 is configured to: provide a battery cell, where in the battery cell includes a pressure relief mechanism, the pressure relief mechanism is disposed on a first wall of the battery cell, and the pressure relief mechanism is configured to be actuated when an internal pressure or temperature of the battery cell reaches a threshold, to relieve the internal pressure; provide a thermal management component, where in the thermal management component is configured to accommodate a fluid to adjust a temperature of the battery cell, a first surface of the thermal management component is attached to the first wall, and the thermal management component is provided with a pressure relief hole opposite to the pressure relief mechanism, so that when the pressure relief mechanism is actuated, emissions discharged from the battery cell can pass through the thermal management component by the pressure relief hole to be discharged; and provide a baffle, the baffle being configured to cover a part of the pressure relief hole, so that when the pressure relief mechanism is actuated, a discharge direction of the emissions entering the pressure relief hole is changed.

Although the present application has been described with reference to the preferred embodiments thereof, various modifications can be made thereto and the components therein can be replaced with equivalents without departing from the scope of the present application. In particular, various technical features mentioned in each embodiments can be combined in any manner, as long as there is no structural conflict. The present application is not limited to the specific embodiments disclosed herein, but includes all technical solutions falling within the scope of the claims.

What is claimed is:

1. A battery, comprising:
 a battery cell comprising a pressure relief mechanism; and
 a baffle corresponding to the pressure relief mechanism, so that when the pressure relief mechanism is actuated, a discharge direction of emissions discharged from the battery cell is changed;
 wherein the pressure relief mechanism is disposed on a first wall of the battery cell,
 the battery further comprises:
 a first component disposed opposite to the first wall, when the pressure relief mechanism is actuated, emissions discharged from the battery cell can pass through the first component to be discharged;
 wherein the first component is a thermal management component, the thermal management component is configured to accommodate a fluid to adjust a temperature of the battery cell;
 wherein the thermal management component is configured to be capable of being damaged, when the pressure relief mechanism is actuated, by the emissions whose discharge direction has been changed, so that the fluid is discharged from an interior of the thermal management component.

2. The battery according to claim 1, wherein the first component is attached to the first wall.

3. The battery according to claim 1, wherein a maximum distance between the baffle and the first wall is greater than a minimum distance from the first surface to the first wall.

4. The battery according to claim 1, wherein the first component is provided with a pressure relief hole opposite to the pressure relief mechanism, so that when the pressure relief mechanism is actuated, emissions discharged from the battery cell can pass through the first component by the pressure relief hole to be discharged.

5. The battery according to claim 4, wherein the baffle is configured to cover a part of the pressure relief hole, so that when the pressure relief mechanism is actuated, the discharge direction of the emissions entering the pressure relief hole is changed.

6. The battery according to claim 4, wherein the baffle is inclined with respect to an axis of the pressure relief hole, and the baffle gradually approaches the axis of the pressure relief hole along a direction away from the first wall, so that when the pressure relief mechanism is actuated, the emissions can impact toward a hole wall of the pressure relief hole.

7. The battery according to claim 6, wherein a value of an angle between the baffle and the axis of the pressure relief hole ranges from 20° to 40°.

8. The battery according to claim 4, wherein the pressure relief hole is surrounded by two baffles arranged opposite to each other.

9. The battery according to claim 4, wherein a ratio of an area of the baffle covering the pressure relief hole to an area of the pressure relief hole is not less than 0.5 and not more than 0.8.

10. The battery according to claim 4, wherein the baffle is disposed on a second surface of the first component, and the second surface is opposite to the first surface or the second surface is a hole wall of the pressure relief hole.

11. The battery according to claim 1, wherein the battery further comprises:
 an electrical chamber configured to accommodate a plurality of battery cells;
 a collection chamber configured to collect the emissions discharged from the battery cell when the pressure relief mechanism is actuated;
 wherein the first component is configured to isolate the electrical chamber from the collection chamber.

12. The battery according to claim 11, wherein the battery further comprises:
 a protective member, the protective member is configured to protect the first component, and the protective member and the first component form the collection chamber.

13. The battery according to claim 12, wherein the protective member comprises a bottom wall and a plurality of side walls to form a hollow structure with an opening at one end, and the first component covers the opening to form the collection chamber.

14. The battery according to claim 13, wherein an end of the baffle away from the first wall abuts against the bottom wall of the protective member.

15. The battery according to claim 1, wherein the thermal management component is provided with a temperature-sensitive material, the temperature-sensitive material is configured to be melted by the emissions when the pressure relief mechanism is actuated, so that the fluid is discharged from the interior of the thermal management component.

16. The battery according to claim 15, wherein the temperature-sensitive material is disposed on an area of the thermal management component facing the emissions from the battery cell.

17. A power consumption device, comprising: a battery, and the battery being configured to supply electrical energy to the power consumption device, the battery comprising:
- a battery cell comprising a pressure relief mechanism; and
- a baffle corresponding to the pressure relief mechanism, so that when the pressure relief mechanism is actuated, a discharge direction of emissions discharged from the battery cell is changed;
- wherein the pressure relief mechanism is disposed on a first wall of the battery cell,
- the battery further comprises:
- a first component disposed opposite to the first wall, when the pressure relief mechanism is actuated, emissions discharged from the battery cell can pass through the first component to be discharged;
- wherein the first component is a thermal management component, the thermal management component is configured to accommodate a fluid to adjust a temperature of the battery cell;
- wherein the thermal management component is configured to be capable of being damaged, when the pressure relief mechanism is actuated, by the emissions whose discharge direction has been changed, so that the fluid is discharged from an interior of the thermal management component.

* * * * *